United States Patent [19]

Carolan

[11] Patent Number: 5,502,544
[45] Date of Patent: Mar. 26, 1996

[54] PARAMETER BASED DIGITAL SERVO CONTROLLER

[75] Inventor: Kevin M. Carolan, Webster, N.Y.

[73] Assignee: Xerox Corporation, Stamford, Conn.

[21] Appl. No.: 306,295

[22] Filed: Sep. 15, 1994

[51] Int. Cl.$^6$ ................................................ G03G 21/00
[52] U.S. Cl. .......................................... 355/204; 355/208
[58] Field of Search .................................. 355/200, 202, 355/203, 204, 208, 210

[56] References Cited

U.S. PATENT DOCUMENTS

| | | | |
|---|---|---|---|
| 4,882,778 | 11/1989 | Hosaka et al. | 355/200 X |
| 5,105,208 | 4/1992 | Matsuoka et al. | 355/200 X |
| 5,325,155 | 6/1994 | Perry | 355/208 |

*Primary Examiner*—William J. Royer
*Attorney, Agent, or Firm*—Ronald F. Chapuran

[57] ABSTRACT

An imaging machine is provided having a control and movable components including a photosensitive member and copy sheet transports. The control includes a main controller and a servo system interconnected over a serial command bus, and the servo system is electrically connected to a given movable component, and provided with a control profile for directing the movement of the given movable component. The control profile includes acceleration, deceleration, and constant velocity portions, and the main controller includes logic for monitoring the operation of the servo system for predetermined conditions and automatically changing selected portions of the the control profile for the given servo system in response to detecting predetermined conditions by downloading changes over the serial command bus.

23 Claims, 4 Drawing Sheets

PARAMETER BASED DIGITAL SERVO CONTROLLER

BACKGROUND OF THE INVENTION

The invention relates to servo system control, in particular, to the customization of control profiles by the automatic downloading of parameters from a main control over a serial command bus to the servo system control.

For reliable and rapid movement of copy sheets through a reproduction machine, it is important to synchronize various drives and transports. This is important, in particular, in multi-drive machines such as in color machines wherein efficient registration and movement of sheets is essential to quality output. In particular, component wear and degradation can often cause a deviation from acceptable performance. For example, excessive variance in the speed of driven components due to aging can cause machine malfunctions. In addition, in an age demanding a variety of machine features and various machines to provide the features, the use of too many custom designed servo controls or other drives to provide the features creates an additional obstacle to consistant and reliable performance. For example, in a printing or reproduction machine, there are a variety of control profiles required for various applications such as driving the photoreceptor, driving a recirculating document handler or automatic document feeder, or driving copy sheets at various stages such as from the copy sheet source, to a registration gate, during a transfer operation, entering and exiting a fusing station, and delivering copy sheets to many finishing stages such as to output trays, sorters, stackers, compilers, and staplers.

It would be desirable, therefore, to provide a servo control whose control profile is easily adapted for a variety of control applications and can be easily and automatically altered in response to component deterioration and changing requirements. It is also desirable to provide a servo control whose control profile includes control parameters that can be automatically changed in response to recognizing predetermined conditions.

It is an object, therefore, of the present invention to provide a new and improved servo control system with a control profile that can be automatically altered in response to component deterioration and in response to recognizing predetermined conditions Another object of the present invention is to be able to automatically download and change profile parameters over a serial command bus to meet changing motor control requirements. Other advantages of the present invention will become apparent as the following description proceeds, and the features characterizing the invention will be pointed out with particularity in the claims annexed to and forming a part of this specification.

SUMMARY OF THE INVENTION

The invention relates to an imaging machine having a control and movable components including a photosensitive member and copy sheet transports, the control including a main controller and a servo system interconnected over a serial command bus. The servo system is electrically connected to a given movable component and the servo system is provided with a control profile for directing the movement of the given movable component. The control profile includes acceleration, deceleration, and constant velocity portions and the main controller includes logic for monitoring the operation of said servo system for predetermined conditions and automatically changing selected portions of the the control profile for the given servo system in response to detecting said predetermined conditions. This is done by downloading changes over the serial command bus.

For a better understanding of the present invention, reference may be had to the accompanying drawings wherein the same reference numerals have been applied to like parts and wherein:

DETAILED DESCRIPTION OF THE DRAWINGS

Figure 4A:
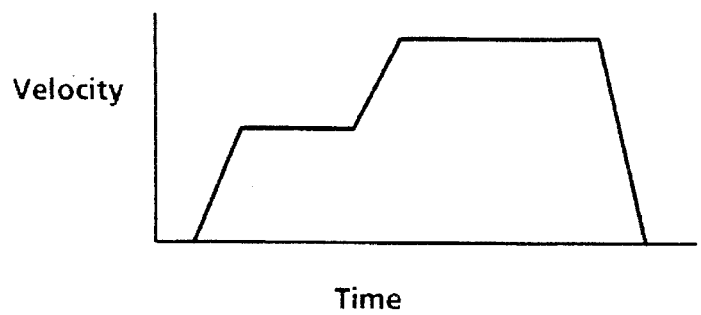
Figure 4B:
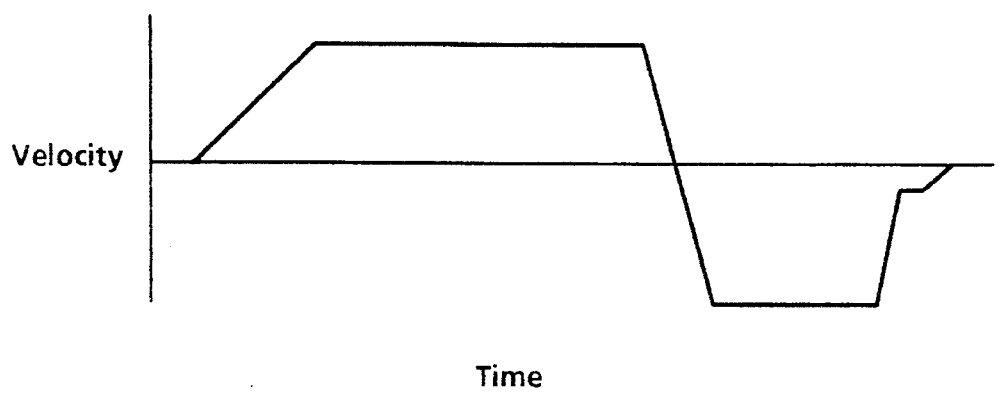
Figure 4C:
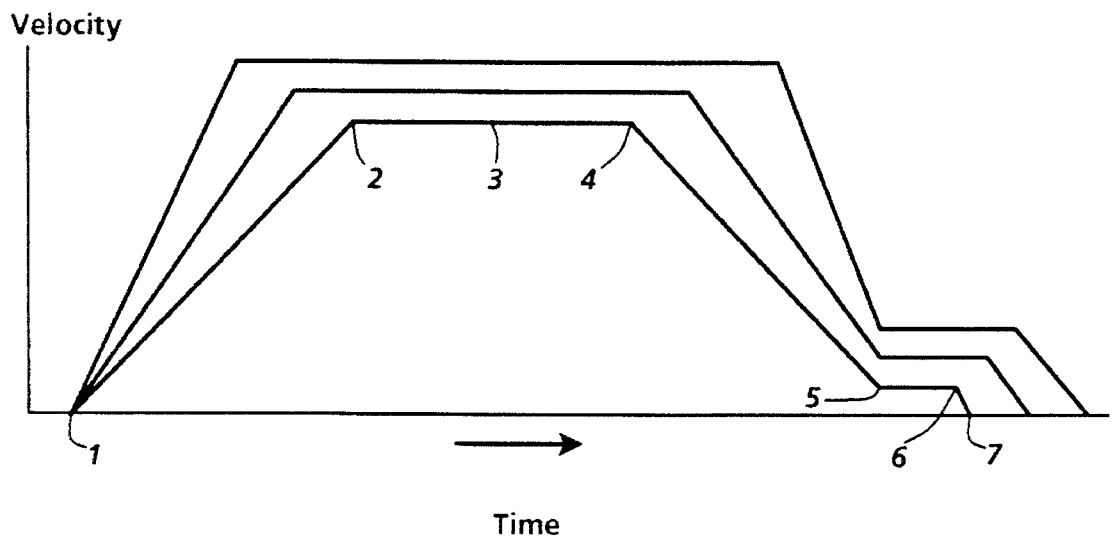
Figure 5:
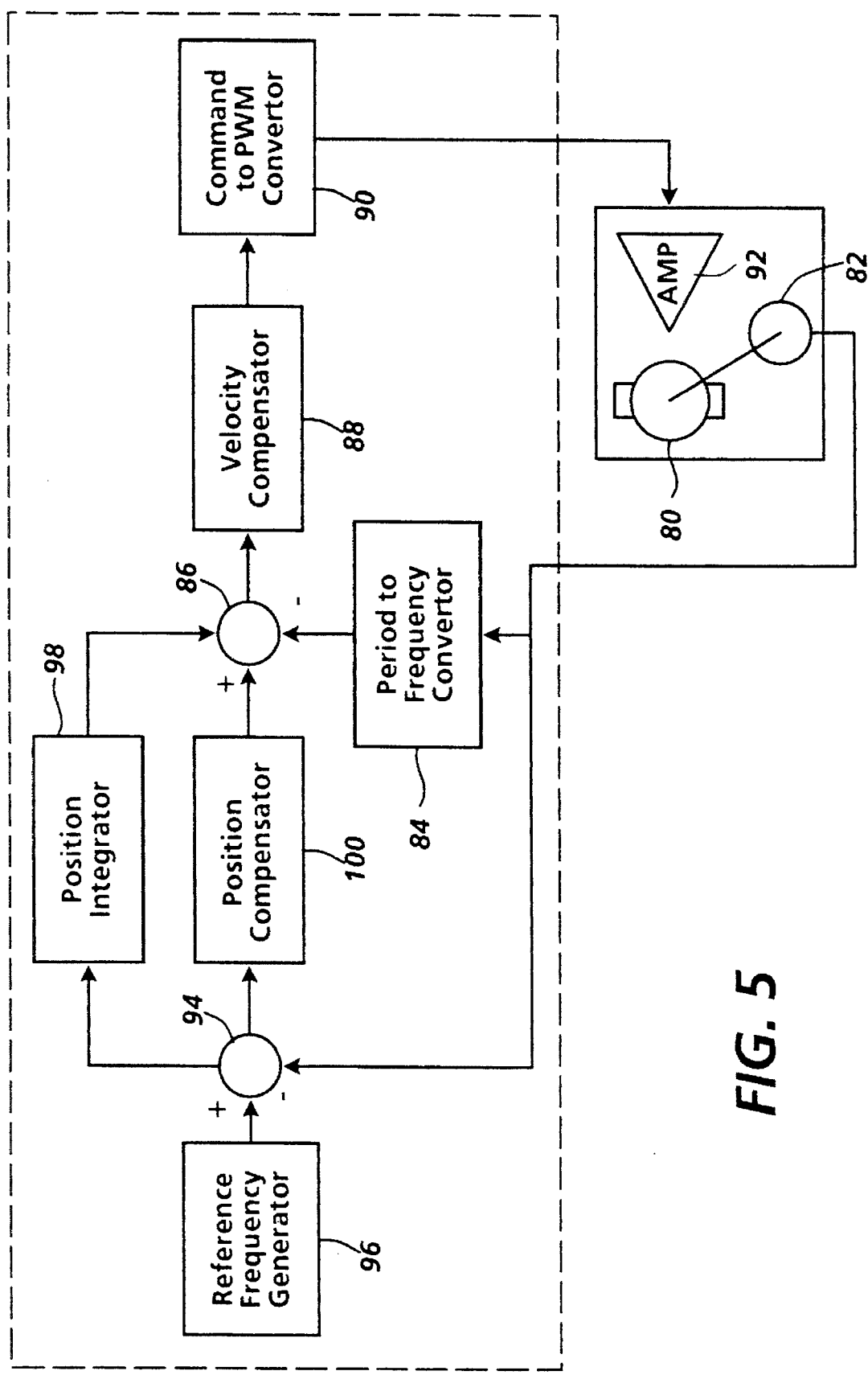

FIGS. 4A, 4B, and 4C illustrate typical control profiles for a servo control system; and FIG. 5 is a block diagram of one half of a dual servo controller in accordance with the present invention.

DETAILED DESCRIPTION OF THE PREFERRED EMBODIMENT

Figure 1:
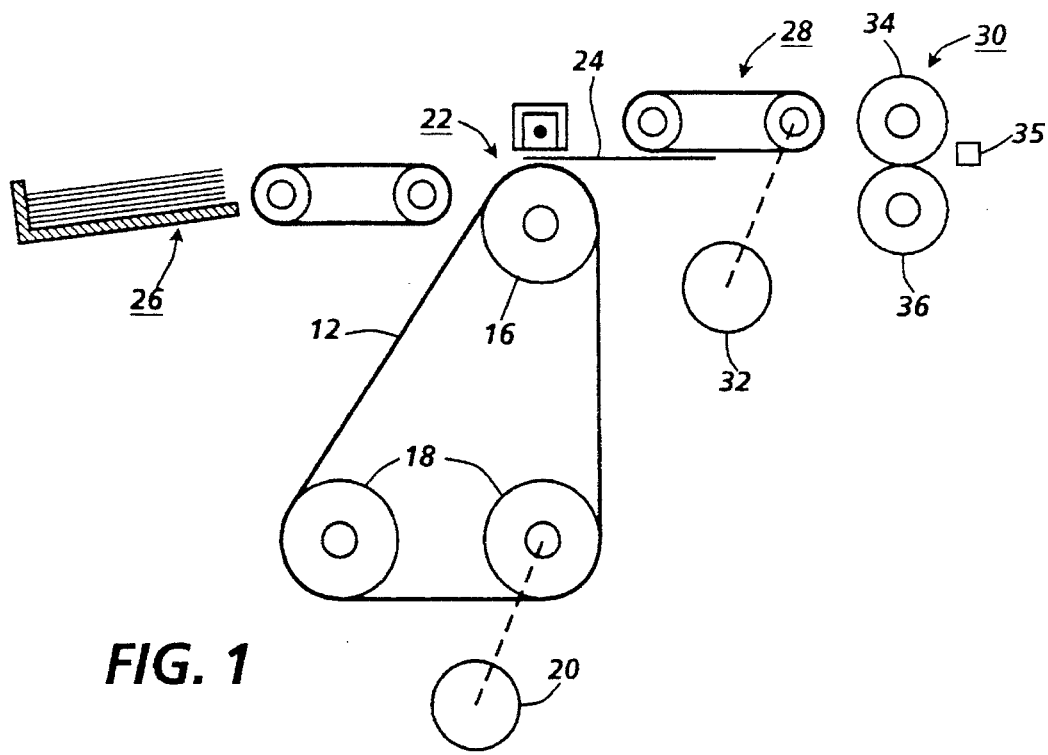
FIG. 1 is an elevational view illustrating portions of a typical machine incorporating the present invention.

Referring to FIG. 1 there is shown a photoreceptor surface 12 wrapped over supporting rolls, 16, and 18 and driven by a first servo system 20. At transfer station 22, a developed toner image on photoreceptor surface 12 is transferred to a copy sheet 24 suitably supplied from a copy sheet source 26. The copy sheet 24 is then immediately stripped from the photoreceptor surface 12 for engagement by a prefuser transport 28 to be delivered to fuser 30 for permanently fixing the toner image to the copy sheet. Preferably, fuser 30 includes a heated fuser roller 34 and a pressure roller 36 with the powder image on the copy sheet contacting fuser roller 34. After fusing, a suitable sensor 35 detects the absence or presence of a copy sheet leaving fuser 30 and the copy sheets are then advanced to an appropriate not shown output tray or finishing station.

The prefuser transport 28 is driven by a second servo system 32 and the stress or tension placed upon the copy sheet 24 when overlapping both roll 16 and prefuser transport 28 is a function of the speed of the photoreceptor surface at roll 16 and the speed of the prefuser transport. The relative speed of the photoreceptor surface at roll 16 and the speed of the prefuser transport 28 is, in turn, a function of the power delivered to the photoreceptor surface by the first servo system and the power delivered to the prefuser transport by the second servo system.

In particular, if the speed of the prefuser transport 28 is greater than the speed of the photoreceptor surface at roll 16, then there will be a tendency for the prefuser transport to pull the copy sheet away from the photoreceptor surface at roll 16. On the other hand, if the speed of the prefuser transport 28 is less than the speed of the photoreceptor surface at roll 16, there will be a tendency of the photoreceptor surface at roll 16 to push the copy sheet ahead of the prefuser transport 28, often times causing the sheet to warp or buckle. In either case, smudging or other degradation of the developed image on the copy sheet will occur to the detriment of the quality of the finished product.

Figure 2:
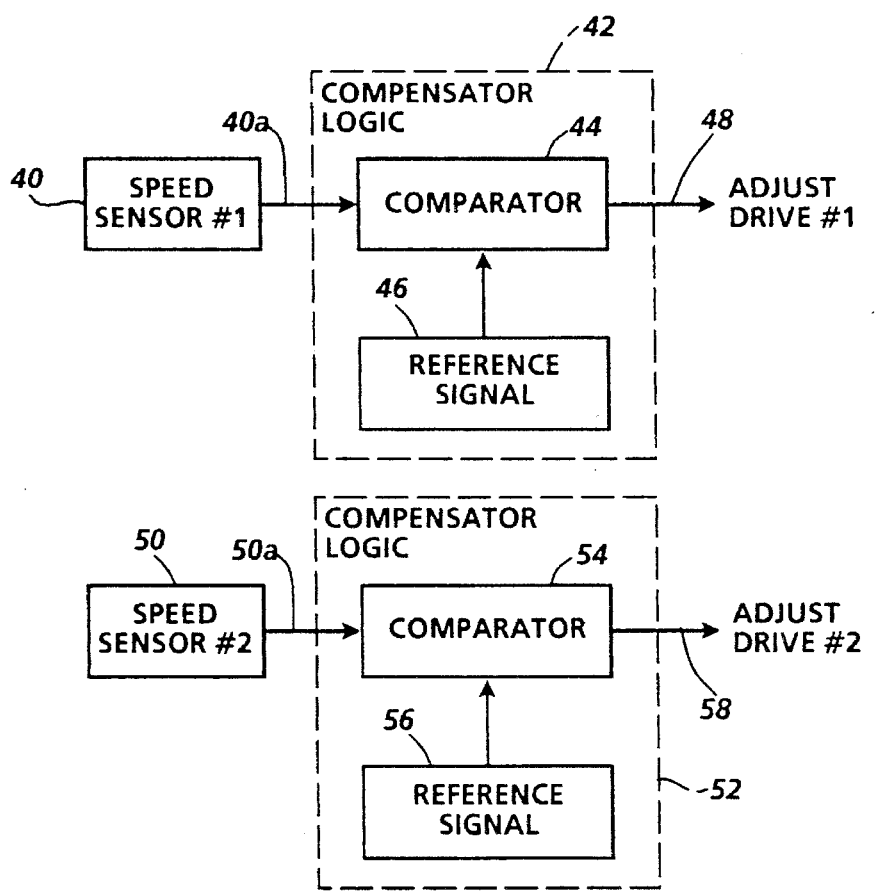
FIG. 2 is a block diagram depicting a typical servo control system.

With reference to FIG. 2, in accordance with the present invention, a motor or drive speed sensor 40 disposed adjacent the roll 16 determines the velocity or speed of the photoreceptor 12 at roll 16. A suitable signal 40a is conveyed from the speed sensor to compensator logic generally shown at 42 including comparator 44 and a reference signal 46. The comparator 44 responds to the input signal 40a from speed sensor 40 and the reference signal 46 to provide a signal 48 to adjust servo system 20 to control the speed of the photoreceptor surface 12. In a similar manner, speed sensor 50 disposed adjacent the prefuser transport 28 determines the surface velocity or speed of the prefuser transport and provides a signal 50a to compensator logic 52 including comparator 54 and reference signal 56. The comparator 54 responds to the input signal 50a from the speed sensor 50 and a reference signal 56 to provide a servo system adjust signal 58 to adjust servo system 32 controlling the speed of the prefuser transport 28. Both the compensator logic 42 and compensator logic 52 are interconnected to master control 68 via a two way communication link illustrated at 62. Speed sensors 40 and 50 are any suitable speed sensing devices such as an optical disc mounted on the moving element or the motor shaft and a stationary light source and photodetector to record the number of received signals or pulses per given time period.

Figure 3:
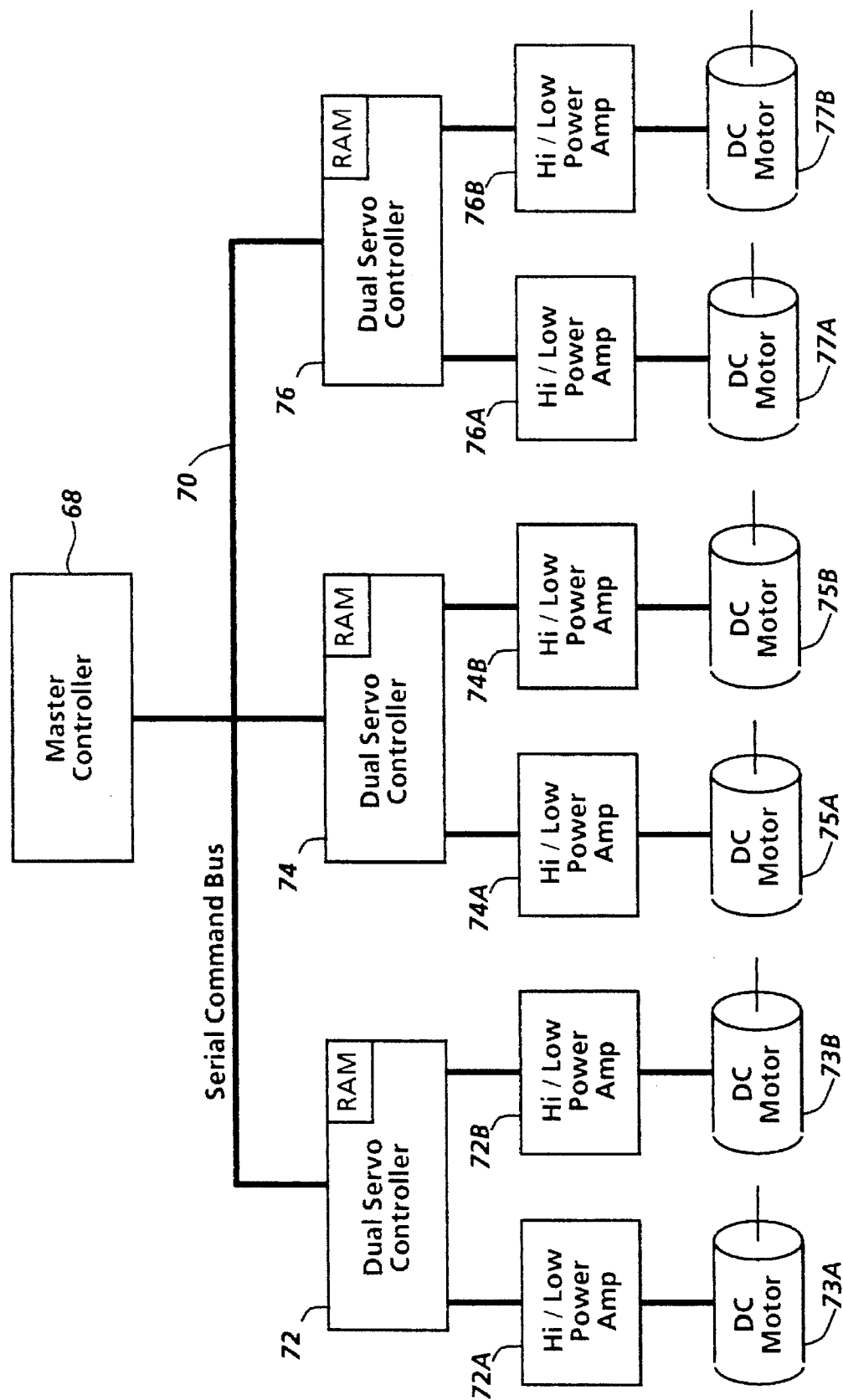
FIG. 3 is a block diagram of the servo control system in accordance with the present invention.

With reference to FIG. 3, there is shown a block diagram of the servo control system in accordance with the present invention. In particular, master controller 68 communicates with dual servo controllers 72, 74, and 76 over the common serial command bus 70. Each dual servo controller includes suitable random access memory (RAM) and read only memory (ROM) as illustrated and controls the operation of a pair of motors. In particular, dual servo controller 72 is connected to DC motor 73A through the HI/low power amplifier 72A and to DC motor 73B through Hi/low power amplifier 72B. In a similar manner dual servo controller 74 controls DC motors 75A and 75B through Hi/low power amplifiers 74A and 74B, and dual servo controller 76 controls DC motors 77A and 77B through Hi/low amplifiers 76A and 76B. It should be understood that three dual servo controllers are shown connected to master controller 68 through the serial command bus 70, but any number of dual servo controllers up to 32 are contemplated within the scope of the present invention.

The serial command bus 70 uses a multiple node master slave serial communication protocol based upon the industry standard UART to interface with the remote PWBA's, in particular dual servo controller 72, 74 and 76. Each of the servo controllers is part of a microcontroller based PWBA with each microcontroller including suitable memory. The serial command bus protocol provides a low cost interface to the microcontroller based PWBA's without burdening the micro controller. The serial command bus protocol includes six general purpose functions (read byte, write byte, read word, write word, block upload and block download) and allows the master controller 68 to view the RAM on any one of thirty-two potential nodes or PWBA's as an extension of the master controller address data bus. A status function allows the master controller to determine the current status of a remote PWBA and a command function allows the master controller to request the remote PWBA to execute one of two hundred and fifty-five potential operations.

FIGS. 4A, 4B, and 4C illustrate various servo control profiles for controlling various components in an imaging machine. For example, FIG. 4A illustrates a typical motor velocity or motor speed profile as a function of time in an imaging machine finishing operation. FIG. 4B illustrates a typical motor driven scanner profile, velocity as a function of time, and FIG. 4C illustrates three examples of a typical control profile of the main drive or a document handler in an imaging machine.

Key parameters of the control profile are illustrated numerically in FIG. 4C. In particular, numeral one represents a reference or zero velocity in the beginning of the control profile. At this point, it is assumed in the control profile procedure that a particular motor encoder counter has been initialized, the amplifier associated with the motor enabled, and a suitable time delay set. It is also assumed that the motor is at the zero or reference velocity, and that there is enabled a suitable speed measurement technique such as monitoring encoder edges. If a time delay elapses before three encoder edges have been received, a motor encoder fault is declared and there is a return to standby. If on the other hand, the encoder edges arrive in time or within the appropriate time delay, the system or control begins to accelerate the motor toward a steady state.

The acceleration is a function of the desired steady state velocity and the amount of time to achieve the steady state velocity. Numeral 2 in FIG. 4C represents that the control has accelerated the motor to the desired constant or steady state. This represents a given number of acceleration steps having been taken to reach the appropriate speed. Numeral 3 represents the enablement of a phase lock mode after a given time delay. There is a phase lock portion of the control, as will be illustrated in FIG. 5, at this time. For example, a position and position integrator gain are set along with a given reference period and an up down counter is initialized to a value that reflects a frictional load in the system.

Numeral 4 generally represents a run distance or distance traveled. Generally, the run distance is variable and is set in a counter to be compared with the incremental distance run during the control profile. Once there is a match between the reference set in a counter and the actual distance traveled the system is initialized for deceleration. At this point, another variable, the final stop distance, is set in a reference counter. Thus numeral 4 represents another parameter in the control profile, the end of the steady state velocity and the beginning of deceleration. The profile contains a number of deceleration steps to achieve the required deceleration and final speed and at numeral 5, the control determines that the speed or deceleration has taken the required number of steps. The next parameter or numeral 6 is the distance from the start of deceleration or the stop distance. Finally, the last parameter or numeral 7 is the recognition of the passage of a time delay that was set in order to wait for the stop distance to elapse. Once the delay has elapsed, the motor amplifier is disabled.

With reference to FIG. 4C, two other control profiles with difference parameters are illustrated in phantom. These represent difference control parameters that represent an adjustment to the initial parameters. Thus, as the machine ages or different conditions occur and are sensed by the main control, the particular control profile is adjusted accordingly. The profiles in phantom illustrate such adjustments in accordance with the present invention.

With reference to FIG. 5, there is shown one half of a dual servo controller such as servo controller 72 shown in FIG. 3. In other words, one PWBA with one dual servo controller is able to provide control for two DC motors. Either of the two DC motors can be altered for changing machine requirements. The changes can be dynamic, for example, paper transport slip or a change in paper thickness, or static, for example, a machine with alternate speeds or copies per minute rating.

In general, the dual servo controller uses a high speed capture function available on industry standard micro controllers for period measurement (250 nano seconds to 2 micro second resolution) to determine the velocity of the motor or the load. The period is converted to a frequency using a 1/T calculation or a 1/T table with linear interpretation. A velocity loop uses proportional control with a single pole (512 micro seconds to 2 milli-seconds sample time). The calculations are sixteen bit scalable fixed point.

The overall structure of the control is state driven with independent state machines for each motor and serial communication. During the different portions of a velocity profile (a different state of a motor state procedure), the values for the proportional gain and the pole position use independent programmable values that are optimized for the specific application and the specific portion of the profile. That is, there is a specific programmable location, such as illustrated by the numbers in FIG. 4C, for the gain and pole location during an acceleration, deceleration, and constant velocity. This is the first loop or velocity control loop of the servo controller.

The second loop in the system is a digital phase lock loop (PLL) that acts as a velocity integrator (zero steady state velocity error) around the proportional velocity loop. The PLL uses an up down counter with fractional resolution between an internally generated reference frequency and the motor encoder to produce an error value. The error value has gain compensation to drive the input to the velocity loop. The phase lock loop can be enabled or disabled during constant velocity. A position integrator can also be enabled and gain compensated to provide zero steady state position error. The initial conditions for changing between velocity and position mode are also programmable to minimize ringing during the transition. The state routines or procedures also provide programmable parameters and input sensor reads to allow for position applications, for example, a document registration system.

With reference to FIG. 5, encoder 82 is mechanically connected to motor 80 and provides motor speed signals to the period to frequency converter 84 which provides one input to a summing junction 86. The summing junction 86 provides a signal to the velocity compensator 88 which provides a motor command to command converter 90 in turn providing a signal to amplifier 92 to adjust motor 80. This loop is the velocity loop. The phase lock loop includes an up down counter 94 receiving signals from a reference frequency generator 96 as well as from the encoder 82 to provide a position error signal to position compensator 100 which in turn provides one of the signal inputs to summing junction 86. As mentioned above, position integrator 98 can be enabled and compensated to provide a zero state position error.

In accordance with the present invention, as discussed above, various parameter or variables are programmable or adjustable automatically from the master controller 68. For example, the velocity, acceleration time, deceleration time, distances, phase lock loop frequency and initial conditions are profile control, variables. In addition, the master controller 68 simply downloads commands over the serial command bus 70 that will yield or provide the required velocity and position profiles for the required application. Thus, the dual servo controller can be customized to a motion application by sending parameters to the microcontroller through the serial command bus. The programmable ability of the closed loop algorithms and the flexibility of the serial communications protocol generally allows one mask ROM or firm-ware to run a multitude of different motion control applications.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

I claim:

1. A reproduction machine having components including a control, a photosensitive member, a transfer station, a copy sheet transport system, and a fuser for producing images on copy sheets, the control including a main controller and a plurality of servo systems interconnected over a serial command bus, the servo systems being electrically connected to said components, each of the servo systems being provided with a control profile for at least one of the components, the improvement comprising logic in the main controller for monitoring the operation of a given servo system and automatically changing the control profile for said given servo system in response to detected conditions.

2. The reproduction machine of claim 1 wherein the logic in the main controller downloads commands over the serial command bus to the servo systems to change the control profiles.

3. The reproduction machine of claim 1 wherein the main controller includes a single transmit/receive chip for communication with said servo systems.

4. The reproduction machine of claim 1 wherein said given servo system controls a plurality of machine components.

5. The reproduction machine of claim 4 wherein said given servo system controls the speed of said plurality of machine components.

6. The reproduction machine of claim 1 wherein a control profile defines a speed verses time relationship of the motion of a machine component.

7. The reproduction machine of claim 6 wherein a control profile includes constant speed, acceleration, and deceleration parameters.

8. An imaging machine having a control and movable components including a photosensitive member and copy sheet transports, the control including a main controller and multiple servo systems interconnected over a serial command bus, the servo systems being electrically connected to said movable components, each of the servo systems being provided with a control profile for at least one of the components, the main controller including logic for monitoring the operation of a given servo system and automatically changing the control profile for said given servo system in response to detected conditions, each servo system including a velocity loop and a phase lock loop, the velocity loop including a period to frequency converter connected between a speed sensor for period measurement and a velocity compensator, the velocity compensator being a function of proportional gain and pole position values, the phase lock loop including an up/down counter to provide an error signal in response to a reference frequency signal and the speed sensor signal.

9. The imaging machine of claim 8 wherein the proportional gain and pole position values are alterable for different portions of a control profile.

10. The imaging machine of claim 9 wherein the control profile includes acceleration, deceleration, and constant velocity portions.

11. The imaging machine of claim 10 wherein the proportional gain and pole position values are optimized for the acceleration, deceleration, and constant velocity portions of the control profile.

12. The imaging machine of claim 8 wherein the error signal of the phase lock loop includes gain compensation to drive an input to the velocity loop.

13. The imaging machine of claim 8 wherein the phase lock loop includes a position integrator to provide a zero steady state position error.

14. An imaging machine having a control and movable components including a photosensitive member and copy sheet transports, the control including a main controller and a servo system interconnected over a bus, the servo system being electrically connected to a first and a second movable component, the servo system being provided with a control profile for directing the movement of the first and second movable components, the control profile including acceleration, deceleration, and constant velocity portions, the main controller including logic for monitoring the operation of the servo system for predetermined conditions and automatically changing selected portions of the control profile for said servo system in response to detecting said predetermined conditions.

15. An imaging machine having a control and movable components including a photosensitive member and copy sheet transports, the control including a main controller and a servo system interconnected over a serial command bus, the servo system being electrically connected to a given movable component, the servo system being provided with a control profile for directing the movement of the given movable component, the control profile including acceleration, deceleration, and constant velocity portions, the main controller including logic for monitoring the operation of said servo system for predetermined conditions and automatically changing selected portions of the control profile for said servo system in response to detecting said predetermined conditions by downloading changes over the serial command bus to the servo system.

16. The imaging machine of claim 15 wherein the predetermined conditions include deterioration of said given movable component.

17. The imaging machine of claim 15 wherein the predetermined conditions include a changing imaging machine environment.

18. The imaging machine of claim 15 wherein the main controller downloads commands over the bus to the servo system to change the control profile.

19. The imaging machine of claim 15 wherein the main controller includes a single transmit/receive chip for communication with said servo system.

20. The imaging machine of claim 15 wherein the servo system includes a velocity loop and a phase lock loop, the velocity loop including a period to frequency converter connected between a speed sensor for period measurement and a velocity compensator, the velocity compensator being a function of proportional gain and pole position values, the phase lock loop including an up/down counter to provide an error signal in response to a reference frequency signal and the speed sensor signal.

21. An imaging machine having a control and movable components the control including a main controller and a servo system interconnected over a bus, the servo system being electrically connected to a given movable component, the servo system being provided with a control profile for directing the movement of a first movable component, the main controller including logic for monitoring the operation of said servo system for predetermined conditions and automatically changing selected portions of the control profile for said servo system in response to detecting said predetermined conditions.

22. The imaging machine of claim 21 wherein the control profile includes acceleration, deceleration, and constant velocity portions.

23. The imaging machine of claim 21 wherein the servo system is provided with a second control profile for directing the movement of a second movable component.

* * * * *